(12) United States Patent
Aoki et al.

(10) Patent No.: US 8,961,910 B2
(45) Date of Patent: Feb. 24, 2015

(54) TANTALUM RECOVERY METHOD

(75) Inventors: Tatsuya Aoki, Saitama (JP); Kenji Matsuzaki, Saitama (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 16 days.

(21) Appl. No.: 14/002,351

(22) PCT Filed: Mar. 16, 2012

(86) PCT No.: PCT/JP2012/056869
§ 371 (c)(1),
(2), (4) Date: Aug. 29, 2013

(87) PCT Pub. No.: WO2012/132962
PCT Pub. Date: Oct. 4, 2012

(65) Prior Publication Data
US 2013/0336858 A1 Dec. 19, 2013

(30) Foreign Application Priority Data
Mar. 31, 2011 (JP) ................................ P2011-077826

(51) Int. Cl.
| | | |
|---|---|---|
| *B01D 11/00* | (2006.01) | |
| *C22B 34/24* | (2006.01) | |
| *C22B 1/00* | (2006.01) | |
| *C22B 7/00* | (2006.01) | |

(52) U.S. Cl.
CPC ................ *C22B 34/24* (2013.01); *C22B 1/005* (2013.01); *C22B 7/007* (2013.01)
USPC .......................................... 423/68; 75/10.67

(58) Field of Classification Search
None
See application file for complete search history.

(56) References Cited

U.S. PATENT DOCUMENTS

| | | | |
|---|---|---|---|
| 6,568,612 B1 * | 5/2003 | Aoki et al. | 241/19 |
| 7,867,317 B2 * | 1/2011 | Lee et al. | 75/704 |
| 2011/0056874 A1 * | 3/2011 | Kojima et al. | 209/552 |
| 2013/0014611 A1 | 1/2013 | Yoshida et al. | |

FOREIGN PATENT DOCUMENTS

| | | |
|---|---|---|
| JP | S64-075632 | 3/1989 |
| JP | H02-302100 | 12/1990 |
| JP | 2000-007338 | 1/2000 |
| JP | 2004-002927 | 1/2004 |
| JP | 2004-224619 | 8/2004 |
| JP | 2009-221514 A | 10/2009 |
| JP | 2010-214352 | 9/2010 |
| JP | 2011-214110 A | 10/2011 |
| KR | 20030006792 A * | 1/2003 |
| WO | WO-2011-125510 A1 | 10/2011 |

* cited by examiner

*Primary Examiner* — Melissa Swain
(74) *Attorney, Agent, or Firm* — Roberts & Roberts, LLP

(57) ABSTRACT

There is provided a technology for decreasing copper and tungsten contained in tantalum-containing wastes, and recovering a high-purity tantalum. The present invention is a tantalum recovery method for recovering tantalum from a tantalum-containing waste, the method comprising subjecting the tantalum-containing waste to an acid treatment in an oxidizing atmosphere, thereafter to a roasting treatment and an alkali treatment, and further comprising carrying out a magnetic separation treatment before the acid treatment to thereby separate a tantalum-containing material in the tantalum-containing waste. This is particularly a suitable recovery method for recovering tantalum from wastes containing a relatively large amount of copper and tungsten such as discarded substrates such as printed wiring boards.

13 Claims, 2 Drawing Sheets

TANTALUM RECOVERY METHOD

BACKGROUND OF THE INVENTION

1. Field of the Invention

The present invention relates to a method for recovering tantalum from a tantalum-containing waste, particularly to a technology for efficiently recovering tantalum from discarded substrates such as printed wiring boards containing tantalum capacitors.

2. Description of the Related Art

Tantalum capacitors have a high capacity and a high stability, and are much used, for example, for personal computers, communication devices such as mobile phones, servers and acoustic devices. Although such tantalum capacitors are mounted on various types of electronic and electric substrates such as printed wiring boards, and distributed in the market, it is the present situation that subsequent used tantalum capacitors are not actively recovered and recycled for economical and technical reasons, and are treated simply as industrial wastes.

Efforts have recently been promoted to recover rare metals from discarded electronic and electric devices and the like and reutilize the recovered rare metals due to the problem of the resource shortage. Then, tantalum being one of the rare metals is anticipated to be recovered in a high efficiency from discarded substrates such as printed wiring boards, and used tantalum capacitors.

As a technology for recovering tantalum from discarded substrates mounting tantalum capacitors, there is known, for example, a method wherein discarded substrates are subjected to a heat treatment in an oxidizing atmosphere at 550° C. or higher, and thereafter, the heat treated material is screened by the major axis length to thereby recover tantalum (Patent Literature 1). There is also known a method wherein coating materials and manganese dioxide solid electrolytes are removed from used tantalum capacitors by an acid leaching, carbon reduction-acid leaching, chlorination-distillation or argon-hydrogen plasma method, and thereafter, tantalum is refined by a chlorination, alkoxidation or electron beam melting method or a combination thereof (Patent Literature 2).

These conventional technologies can recover metallic tantalum and tantalum oxides in some quality from discarded substrates and used tantalum capacitors. However, from the tantalum recovery materials obtained by these conventional technologies, impurities such as silicon (Si), antimony (Sb), phosphorus (P), manganese (Mn), tin (Sn), lead (Pb), zinc (Zn), iron (Fe), nickel (Ni), copper (Cu) and aluminum (Al) could not sufficiently be separated; the tantalum recovery materials, in the state of containing these impurities, were difficult to reutilize as a tantalum raw material. Particularly in the case of recovering tantalum from discarded substrates, although the wastes are likely to contain a large amount of terminals, interconnects and the like containing copper, the large amount of copper (Cu) contained in these wastes was difficult to separate and remove by the conventional art methods. Also in the case where wastes contain tungsten (W) as an impurity, tungsten was difficult to sufficiently decrease by the conventional art methods.

PRIOR ART DOCUMENTS

Patent Literature

Patent Literature 1: Japanese Patent Application Laid-Open No. 2009-221514

Patent Literature 2: Japanese Patent Application Laid-Open No. Sho 64-75632

DISCLOSURE OF THE INVENTION

Problems to be Solved by the Invention

Against the above-mentioned background, the present invention provides a technology for efficiently recovering tantalum from wastes containing tantalum, and particularly a technology for being capable of decreasing impurities such as copper and tungsten, which would become inexpedient on reutilization, from discarded substrates such as printed wiring boards containing tantalum capacitors, and recovering tantalum in a high recovery rate therefrom.

Means for Solving the Problems

The present invention to solve the above-mentioned problem relates to a tantalum recovery method for recovering tantalum from a tantalum-containing waste, the method comprising subjecting the tantalum-containing waste to an acid treatment in an oxidizing atmosphere, thereafter to a roasting treatment and an alkali treatment, wherein the waste is subjected to a magnetic separation treatment before the acid treatment to thereby separate a tantalum-containing material in the tantalum-containing waste. The present invention can separate impurities other than tantalum, for example, copper-containing materials, from tantalum-containing materials, and can recover tantalum-containing materials as tantalum oxides or metallic tantalum wherein impurities have been decreased.

The present invention can efficiently recover tantalum even from wastes, having relatively high contents of copper and tungsten, such as discarded substrates such as printed wiring boards. The present invention can efficiently remove copper by carrying out the acid treatment in a solution made to be in an oxidizing atmosphere, and enables removing also tungsten by carrying out the roasting treatment before the alkali treatment. Hereinafter, the tantalum recovery method according to the present invention will be described in detail.

Tantalum-containing wastes as a recovery object suffice if being wastes containing tantalum, and include, for example, discarded substrates such as printed wiring boards mounting tantalum capacitors, waste chips obtained by grinding these discarded substrates, process defectives in manufacture of capacitors, and tantalum sintered compacts extracted from tantalum capacitors. Above all, tantalum-containing wastes being discarded substrates such as printed wiring boards are preferable as a starting raw material of tantalum-containing wastes applied to the present invention. Although since discarded substrates are likely to contain a large amount of copper, recovered tantalum was likely to be difficult to reutilize as it was by conventional tantalum recovery methods, the recovery method according to the present invention can particularly decrease copper and tungsten also.

The acid treatment in the present invention has a feature in the point that an acid treatment liquid is made to be in an oxidizing atmosphere. In the case where the acid treatment liquid is made to be in an oxidizing atmosphere, copper can efficiently be decreased. In order to make an oxidizing atmosphere, an oxidizing agent such as hydrogen peroxide may be added to an acid treatment liquid, or air (mainly as an oxygen supply source) may be supplied in the solution. For the acid treatment liquid, an acid such as hydrochloric acid, nitric acid or sulfuric acid can be used. In the case where tantalum is recovered from wastes containing a large amount of copper, hydrochloric acid or nitric acid is preferably used, and an acid containing hydrochloric acid is especially preferably used. The above-mentioned acid treatment can remove impurities such as antimony, manganese, tin, lead, zinc, iron, nickel, aluminum, titanium, silicon, chromium and tungsten, and in the case where discarded substrates such as printed wiring boards are used as a starting raw material of wastes, the acid treatment can efficiently remove copper such as compounds containing a relatively large amount of copper and copper alloys by carrying out the acid treatment in an oxidizing atmosphere. The above acid treatment is carried out preferably after pre-treatments such as a magnetic separation treatment described in detail below are carried out.

The acid treatment according to the present invention, also in the case where wastes contain silver (Ag), can remove silver by using hydrochloric acid as an acid treatment liquid. The silver in the wastes can be recovered as silver chloride from a filtrate by carrying out a filtration treatment after the acid treatment. In the case where hydrochloric acid is used for the acid treatment, manganese dioxide ($MnO_2$) in tantalum-containing wastes dissolves in the hydrochloric acid to thereby generate chlorine gas. Then, a reaction of the generated chlorine gas with the silver forms silver chloride (AgCl) to thereby allow the recovering. Although part of the formed silver chloride is in the state of dissolving in hydrochloric acid, the silver chloride can be precipitated as silver chloride by carrying out a filtration treatment after the acid treatment and diluting the filtrate. Thereafter, if a filtration treatment is again carried out, silver chloride can be recovered from the precipitate.

In the recovery method according to the present invention, after the acid treatment described above, a roasting treatment is carried out before an alkali treatment. If the roasting treatment is carried out, impurities such as tungsten, which are difficult to remove only by an acid treatment, become easy to remove. Impurity metals remaining after the acid treatment are oxidized by a roasting treatment, and allowed to be dissolved and removed in a subsequent alkali treatment. The condition of a roasting treatment can optionally be selected depending on the kind of tantalum-containing wastes. The roasting temperature is preferably 300° C. or higher, more preferably 300 to 1,000° C., and most preferably 700 to 1,000° C. The roasting is carried out preferably in the air for 0.5 to 8 hours.

After the roasting treatment, an alkali treatment is carried out. The alkali treatment can decrease impurities such as tin, lead, iron, copper, nickel and phosphorus which have not been removed by the acid treatment and remain in tantalum recovery materials. The present invention particularly has a feature in the point that even in the case where tungsten is much contained as an impurity, tungsten can be decreased since an alkali treatment is carried out after the above-mentioned roasting. Although the case where an alkali treatment is carried out without a roasting treatment can decrease impurities such as tin, lead, iron, copper, nickel and phosphorus, tungsten is difficult to be decreased. The above-mentioned alkali treatment can be carried out with use of sodium hydroxide or potassium hydroxide.

The present invention carries out an acid treatment, a roasting treatment and an alkali treatment in order as described above, but achieves recovery of tantalum of a higher quality by carrying out a magnetic separation treatment before the acid treatment. In the case where recovery objects containing a relatively large amount of copper, for example, as in discarded substrates are used, if a magnetic separation treatment is carried out before an acid treatment to thereby separate copper in some degree, recovery of tantalum of a high quality can be achieved. This is because although copper can be separated also in an acid treatment step, if the copper content is reduced in a pre-treatment step, the subsequent acid treatment, roasting treatment and alkali treatment can effectively be carried out. If a magnetic separation treatment is carried out, a load of the acid treatment step can be reduced and the treatment cost also can be reduced. Here, in the present invention, "a magnetic separation treatment is carried out before an acid treatment to thereby separate tantalum-containing materials and copper-containing materials in tantalum-containing wastes" means that by carrying out a magnetic separation treatment, nickel, iron and the like unified with copper by adhesion, bonding or the like are magnetically attracted to thereby separate the copper-containing materials unified with a magnetic material from the tantalum-containing materials. The tantalum-containing materials contain tantalum oxides, metallic tantalum and the like, and the copper-containing materials contain compounds containing copper, copper alloys and the like.

The magnetic separation treatment before the acid treatment may be carried out a plurality of times. In the case of carrying out the treatment a plurality of times, magnetic separation conditions (magnetic flux density, treatment time, type of the apparatus and the like) different for each number of times of magnetic separation can be adjusted according to purposes such as the removal of ferromagnetic materials such as iron and nickel in a first-time magnetic separation treatment, and the removal of metals other than ferromagnetic materials, such as copper, zinc, chromium, aluminum, silicon, silver and tungsten, in second- and successive-time magnetic separation treatments. Particularly in the case where tantalum is recovered from wastes having a relatively high copper content, the copper content can largely be reduced by the second- and successive-time magnetic separation treatments. This is because in the second- and successive-time magnetic separation treatments, elements unified with ferromagnetic materials such as iron and nickel by adhesion, bonding, alloying or the like among elements such as copper can be magnetically attracted and removed. Tantalum being the recovery object of the present invention is unified with terminals or lead wire containing ferromagnetic materials such as iron and nickel, and weak magnetic materials such as manganese dioxide ($MnO_2$) by adhesion, bonding, alloying or the like in wastes, and becomes liable to be magnetically attracted in some cases. Therefore, in order to magnetically attract copper while tantalum is not magnetically attracted, the magnetic force and the like can preferably be regulated. In the recovery method according to the present invention, from factors as described above, the case where the magnetic separation treatment is carried out separately in a plurality of times enables raising the tantalum purity than the case where the magnetic separation treatment is carried out one time. In the case where the magnetic separation treatment is carried out separately in a plurality of times, after a first-time magnetic separation treatment, treatments other than the magnetic separation treatment, such as a sieving treatment and a gravity separation treatment, may be carried out. For the magnetic separation treatment, a general magnetic separator can be used, and a suitable treatment condition can be employed depending on the kinds of wastes and impurities as removal objects.

In the case where a magnetic separation treatment is carried out in the present invention, the treatment is carried out preferably at a maximum magnetic flux density of 2,000 G to 7,000 G, and more preferably 2,500 G to 6,500 G. If the maximum magnetic flux density is lower than 2,000 G, removal of magnetically attracted materials cannot sufficiently be carried out and the magnetic separation treatment time is likely to be elongated. If it exceeds 7,000 G, tantalum is highly likely to be magnetically attracted and the recovery amount of tantalum decreases.

In order to recover tantalum-containing materials more efficiently, it is preferable that a crushing treatment or the like is carried out before the magnetic separation treatment to thereby in advance separate resins contained in discarded substrates such as printed wiring boards. In order to remove fine powders produced in the crushing treatment, it is preferable that a sieving treatment or the like is carried out after the crushing treatment. In the fine powders, fine powders containing tantalum are generated in some cases. Therefore, tantalum is preferably recovered also from the fine powders.

In the roasting treatment after the acid treatment in the present invention, the above-mentioned oxidation of impurities enables decreasing tungsten and the like in the alkali treatment. Since the roasting treatment can reduce the influence of an acid by the acid treatment, the alkali treatment can efficiently be carried out. By contrast, given the case where a roasting treatment is carried out before an acid treatment, decreasing impurities such as manganese, tin and lead in the acid treatment becomes difficult. This is conceivably because the roasting treatment before the acid treatment forms higher-order oxides and composite oxides such as $MnTa_2O_6$ containing impurities, and the impurities become difficult to leach out by the subsequent acid treatment.

In the tantalum recovery method according to the present invention as described above, as pre-treatments before an acid treatment for tantalum-containing wastes being a recovery object, well-known treatment methods can be employed, such as a crushing treatment, a grinding treatment, a magnetic separation treatment, a gravity separation treatment, a sieving separation treatment, a roasting treatment, an eddy-current separation treatment, an electrostatic separation treatment and a color separation treatment. These pre-treatments can be applied in a suitable combination of a plurality of treatment steps depending on the kinds of wastes such as discarded substrates, waste chips, process defectives in manufacture of capacitors, and tantalum sintered compacts extracted from tantalum capacitors. By these pre-treatments, impurities such as iron, manganese, zinc, copper, aluminum and silicon are in advance decreased to some degree, and the recovery efficiency of the tantalum recovery method according to the present invention can thereby be improved.

Tantalum recovered by the tantalum recovery method according to the present invention is refined by a solvent extraction method or the like, and further concentrated to a high-purity tantalum, and can be provided for reutilization. The tantalum recovery method according to the present invention can remove impurities such as copper and tungsten, which would become inexpedient for further refining treatments, and can efficiently obtain a high-purity tantalum.

Advantageous Effects of the Invention

The present invention can decrease impurities becoming inexpedient on reutilization, and can efficiently recover a high-purity tantalum from tantalum-containing wastes.

DETAILED DESCRIPTION OF THE PREFERRED EMBODIMENTS

Figure 1:
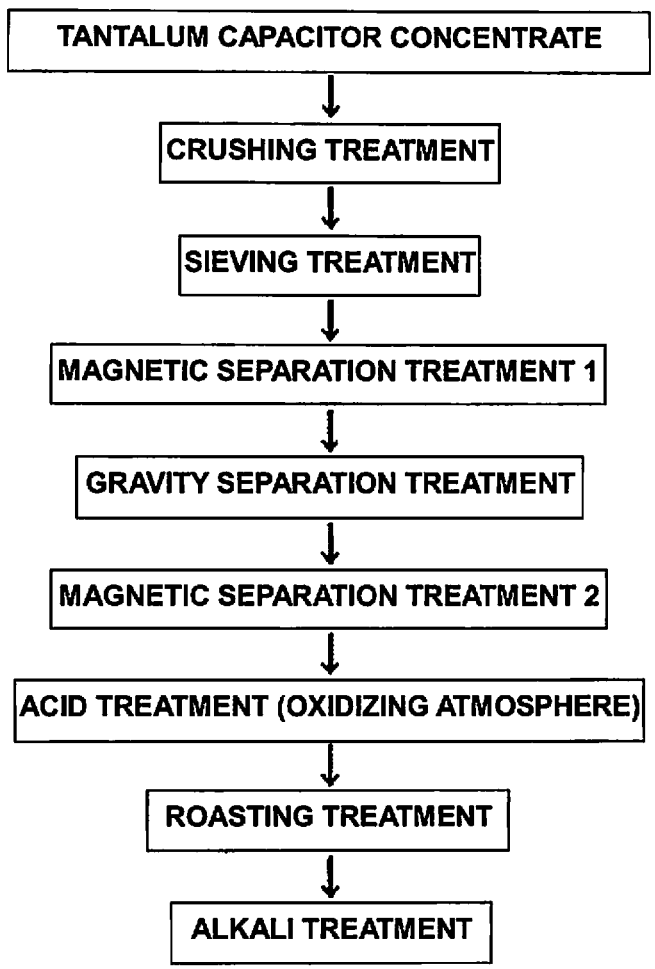
FIG. 1 is a step flow diagram of a tantalum recovery method according to the present embodiment.

First, each step of a tantalum recovery method according to the present embodiment will be described by way of the flow of FIG. 1. In the present embodiment, as tantalum-containing wastes being a recovery object, a tantalum capacitor condensate obtained from discarded substrates such as used printed wiring boards was used. In the present recovery method, first, the concentrate was subjected to pre-treatments of a crushing treatment, a sieving treatment, a magnetic separation treatment, a gravity separation treatment and a magnetic separation treatment in order. Here, these pre-treatments are only examples, and there are cases where some pre-treatments are not essential depending on the recovery object. The procedures, conditions and the like of the pre-treatments can suitably be altered depending on the recovery object. Hereinafter, each step will be described in detail.

Tantalum capacitor concentrate: A tantalum capacitor concentrate is obtained by separating devices from discarded substrates such as used printed wiring boards mounting tantalum capacitors by a crushing treatment, a sieving treatment, a gravity separation treatment and the like as described in Japanese Patent Laid-Open No. 2010-214352, and concentrating the tantalum capacitors.

Crushing treatment: The above-mentioned tantalum capacitor concentrate was subjected to a crushing treatment. The crushing treatment carries out separation of tantalum and resins in capacitors. For the crushing treatment, a commercially available crushing machine can be used, and a crushing machine of a cutter mill type of a shearing crushing type is preferably used. A cutter mill-type crushing machine can easily crush and separate capacitor armor portions. In the present embodiment, a commercially available single-screw crushing machine was used. The tantalum capacitor concentrate was crushed into a size of 0.001 to 2 mm by this crushing machine.

Sieving treatment: After the crushing treatment, a sieving treatment was carried out by an electromagnetic sieve shaker. Fine powders and relatively large bulky materials produced by the crushing treatment were separated by the sieving treatment. In the present embodiment, a sieve of 150 μm in mesh opening diameter was used.

Magnetic separation treatment (first-time): After the sieving treatment, a separation treatment by a magnetic force was carried out on bulky materials remaining on the sieve. In the present embodiment, the magnetic separation treatment was carried out twice; in the first-time magnetic separation treatment, mainly terminals, electrodes, connectors, screws, pins and the like containing ferromagnetic materials such as iron and nickel were removed. The magnetic separation treatment can use a commercially available magnetic separator. The first-time magnetic separation treatment was carried out with use of a drum magnetic separator utilizing a drum-type ferrite magnet. The magnetic separation treatment was carried out by this magnetic separator under the condition of a maximum magnetic flux density (drum surface) of about 3,000 G and a drum rotation frequency of 38 rpm.

Gravity separation treatment: A gravity separation treatment was carried out on non-magnetically attracted materials in the magnetic separation treatment to thereby separate and remove light-weight products containing resins and the like, and heavy products containing tantalum were recovered. The gravity separation treatment can use a commercially available gravity separator. In the present embodiment, a gravity-separation apparatus using wind power and vibration was used. The separation conditions were made to be a vibration frequency of 11 Hz, a wind velocity of 1.1 m/sec, a tilt of 7° and a charging rate of 0.24 kg/min.

Magnetic separation treatment (second-time): The heavy products of the gravity separation treatment were again subjected to a magnetic separation treatment. The second-time magnetic separation treatment aimed at decreasing the copper content. In order to decrease the copper content, there is no need to carry out the treatment with a strong magnetic force and the maximum magnetic flux density is preferably made to be 500 G or higher. A commercially available magnetic separator may be used. In the present embodiment, the heavy products after the gravity separation treatment were subjected to a separation treatment using a magnet of 1,860 G in maximum magnetic flux density. Non-magnetically attracted materials in the second-time magnetic separation treatment were subjected to the following acid treatment, roasting treatment and alkali treatment.

Acid treatment: An acid treatment was carried out on recovered materials after the above-mentioned pre-treatments. In the following first embodiment, the acid treatment condition was variously altered; but in other embodiments, the treatment condition of using a 6-mol/L hydrochloric acid and at 80° C. for 5 hours was made to be the standard. During the acid treatment, air was supplied to make an oxidizing atmosphere. After the acid treatment, solid materials in the solution were filtered and recovered.

Roasting treatment: After the acid treatment, the filtered and recovered materials were subjected to a roasting treatment to thereby oxidize tungsten and the like. The condition of under the air atmosphere and at 900° C. for 4 hours was made to be the standard for the roasting treatment. After the roasting treatment, an alkali treatment may be immediately carried out, but an alkali treatment is preferably carried out after a sieving treatment. Since the sieving treatment can remove the bulky materials likely to contain many impurities, the removal efficiency of impurities in the alkali treatment becomes high.

Alkali treatment: After the roasting treatment, an alkali treatment using a sodium hydroxide solution was carried out. The treatment condition of using a 10-wt % sodium hydroxide solution and at 80° C. for 2 hours was made to be the standard for the alkali treatment. After the completion of the treatment, solid materials in the solution were filtered and recovered. Tantalum being the object material was recovered by the above acid treatment, roasting treatment and alkali treatment.

In the following first to fourth embodiments, with the above recovery method as the basis, tantalum was recovered by varying respective treatment conditions of the acid treatment, the roasting treatment, the alkali treatment and the magnetic separation treatment. In a fifth embodiment, the series of the treatment steps was carried out under suitable conditions to thereby recover tantalum. Here, raw materials in Tables 1 to 6 refer to materials treated up to one-preceding step in the treatment steps of the acid treatment, the roasting treatment and the alkali treatment. For example, a "raw material" in the roasting treatment in Table 4 refers to a material treated up to the pre-treatment and the acid treatment. A weight in a "weight/liquid volume ratio" described on the lower part of each table indicates a weight of a raw material (sample) provided for the each treatment.

First Embodiment

In the present embodiment, the acid treatment conditions were studied. Wastes having been subjected to the pre-treatment according to the recovery method made as the basis in the above were subjected to an acid treatment under respective treatment conditions, and thereafter washed with water; and the filtration residues were roasted at 900° C. for 4 hours, and subjected to a fluorescent X-ray analysis.

The respective acid treatment conditions were such that as shown in the following Tables 1 to 3, the oxidizing atmosphere (aeration intensity), the kind and the concentration of chemical liquids, the treatment temperature and time, and the chemical liquid volume to the waste treatment amount were varied. The criterion was such that the case where there was a removal effect of copper was defined as ○, and particularly the case where the copper concentration was below the detection limit was defined as ◎.

TABLE 1

| No | Chemical Liquid | Air Supply L/min | Concentration (wt %) | | | | | | | | | | Evaluation |
|---|---|---|---|---|---|---|---|---|---|---|---|---|---|
| | | | Ta$_2$O$_5$ | Cu | W | Mn | Fe | Sn | Pb | Ni | Zn | Al | |
| Raw Material A | | | 53.8 | 6.85 | 18.5 | 5.98 | 0.05 | 1.19 | 1.32 | 0.16 | 1.97 | 0.06 | |
| 1 | HCl | — | 60.7 | 14.9 | 14.3 | 0.12 | 0.02 | 0.65 | 0.06 | 0.20 | 0.45 | 0.07 | X |
| 2 | HCl + H$_2$O$_2$ | — | 72.7 | 1.4 | 19.5 | 0.18 | 0.03 | ND | ND | 0.02 | ND | 0.08 | ○ |
| 3 | HCl | 0.1 | 70.6 | 0.8 | 21.8 | 0.26 | 0.02 | ND | ND | 0.03 | ND | 0.05 | ○ |
| Raw Material B | | | 54.9 | 16.5 | 3.69 | 5.99 | 0.09 | 1.91 | 1.77 | 0.47 | 1.52 | 1.70 | |
| 4 | HCl | 1 | 94.9 | ND | 2.47 | 0.43 | 0.02 | ND | ND | ND | ND | 0.21 | ◎ |
| 5 | | 0.1 | 84.5 | 5.89 | 2.99 | 0.26 | 0.04 | 0.53 | 0.05 | 0.10 | 0.14 | 0.49 | ○ |

(ND: below detection limit)
Chemical liquid concentration: 6 mol/L HCl
Treatment temperature and time: (Nos. 1 to 3) 60° C. and 2 h, (Nos. 4 and 5) 80° C. and 5 h
Raw material before acid treatment: (Nos. 1 to 3) raw material A, (Nos. 4 and 5) raw material B
Chemical liquid: (No. 2) HCl 40 ml, H$_2$O$_2$ 5 ml
Weight/liquid volume ratio: (Nos. 1 and 3) 10 g/40 ml, (No. 2) 10 g/45 ml, (Nos. 4 and 5) 15 g/300 ml

TABLE 2

| No | Chemical Liquid | Concentration mol/L | Concentration (wt %) | | | | | | | | | | Evaluation |
|---|---|---|---|---|---|---|---|---|---|---|---|---|---|
| | | | Ta$_2$O$_5$ | Cu | W | Mn | Fe | Sn | Pb | Ni | Zn | Al | |
| Raw Material | | | 54.9 | 16.5 | 3.69 | 5.99 | 0.09 | 1.91 | 1.77 | 0.47 | 1.52 | 1.70 | |
| 6 | HCl | 6 | 94.9 | ND | 2.47 | 0.43 | 0.02 | ND | ND | ND | ND | 0.21 | ◎ |

TABLE 2-continued

| No | Chemical Liquid | Concentration mol/L | Ta$_2$O$_5$ | Cu | W | Mn | Fe | Sn | Pb | Ni | Zn | Al | Evaluation |
|---|---|---|---|---|---|---|---|---|---|---|---|---|---|
| 7 |  | 3 | 93.5 | 0.13 | 2.70 | 0.29 | 0.03 | ND | 0.07 | ND | ND | 0.46 | ○ |
| 8 |  | 1 | 91.6 | 0.16 | 2.91 | 0.55 | 0.03 | ND | 0.10 | ND | ND | 0.68 | ○ |
| 9 | HNO$_3$ | 6 | 85.8 | ND | 3.02 | 0.55 | 0.06 | 2.88 | ND | 0.04 | ND | 0.30 | ◉ |
| 10 | H$_2$SO$_4$ | 6 | 67.0 | 14.5 | 2.26 | 3.76 | 0.10 | 1.33 | 2.49 | 0.12 | 0.21 | 0.24 | Δ |

(ND: below detection limit)
Treatment temperature and time: 80° C. and 5 hr
Air supply: 1 L/min
Weight/liquid volume ratio: 15 g/300 ml

TABLE 3

| No | Temperature °C. | Time hr | Weight/Liquid volume Ratio | Ta$_2$O$_5$ | Cu | W | Mn | Fe | Sn | Pb | Ni | Zn | Al | Evaluation |
|---|---|---|---|---|---|---|---|---|---|---|---|---|---|---|
| Raw Material |  |  |  | 54.9 | 16.5 | 3.69 | 5.99 | 0.09 | 1.91 | 1.77 | 0.47 | 1.52 | 1.70 |  |
| 11 | 80 | 5 | 15 g/300 ml | 94.9 | ND | 2.47 | 0.43 | 0.02 | ND | ND | ND | ND | 0.21 | ◉ |
| 12 | 60 |  |  | 93.0 | ND | 3.32 | 0.36 | 0.02 | ND | 0.06 | ND | ND | 0.37 | ◉ |
| 13 | 30 |  |  | 85.7 | 4.89 | 2.56 | 0.25 | 0.06 | 0.45 | 0.12 | 0.23 | 0.12 | 0.51 | ○ |
| 14 | 80 | 2 |  | 82.1 | 9.03 | 2.01 | 0.25 | 0.06 | 0.61 | 0.05 | 0.10 | 0.07 | 0.28 | ○ |
| 15 |  | 0.5 |  | 76.2 | 13.7 | 2.61 | 0.30 | 0.10 | 0.42 | 0.16 | 0.15 | 0.39 | 0.29 | Δ |
| 16 |  | 5 | 100 g/300 ml | 88.1 | 1.42 | 4.66 | 0.63 | 0.04 | ND | ND | 0.04 | ND | 0.14 | ○ |

(ND: below detection limit)
Chemical liquid: 6 mol/L HCl
Air supply: 1 L/min

From Table 1, a removal effect of copper was observed in the case where during the acid treatment, addition of hydrogen peroxide or air supply made an oxidizing atmosphere. The larger the air supply amount per unit time was, the more copper could be removed. With respect to chemical liquids, from Table 2, impurities could be decreased in the case where hydrochloric acid, nitric acid or sulfuric acid was used, and copper could be efficiently removed particularly in the case where hydrochloric acid or nitric acid was used. The higher the chemical liquid concentration was, the more impurities could be removed. From Table 3, the higher the liquid temperature during the acid treatment was and the longer the treatment time was, the more impurities could be removed. The larger the treatment liquid volume to the waste treatment amount, the higher the impurity removal effect. From the above, the acid treatment conditions are: preferably a chemical liquid concentration of 3 mol/L or higher; preferably a treatment temperature of 40° C. or higher; and preferably a treatment time of 1 hour or longer.

Second Embodiment

In the present embodiment, the roasting treatment conditions were studied. Wastes having been subjected to the pretreatment and the acid treatment according to the recovery method made as the basis in the above were subjected to a roasting treatment under respective treatment conditions, and thereafter subjected to an alkali treatment. After the alkali treatment, the water-washed residues were roasted at 900° C. for 4 hours under the air atmosphere, and samples after the roasting were subjected to a fluorescent X-ray analysis. The criterion was such that the case where a tungsten removal effect was observed was defined as ○, and particularly the case where the tungsten removal effect was high was defined as ◉.

TABLE 4

| No | Roasting Temperature °C. | Time hr | Ta$_2$O$_5$ | W | Evaluation |
|---|---|---|---|---|---|
| Raw Material |  |  | 60.3 | 28.9 |  |
| 17 | — | — | 55.4 | 36.1 | X |
| 18 | 900 | 4 | 75.2 | 3.2 | ◉ |

No roasting treatment in No. 17
Alkali treatment: 10 wt % NaOH, 60° C., 1 hr
Weight/liquid volume ratio: 5 g/40 ml

TABLE 5

| No | Roasting Temperature °C. | Time hr | Ta$_2$O$_5$ | W | Evaluation |
|---|---|---|---|---|---|
| Raw Material |  |  | 70.7 | 12.0 |  |
| 19 | 900 | 4 | 87.0 | 2.0 | ◉ |
| 20 | 600 | 4 | 73.6 | 7.3 | ○ |
| 21 | 300 | 4 | 73.3 | 7.1 | ○ |

Alkali treatment: 10 wt % NaOH, 80° C., 5 hr
Weight/liquid volume ratio: 10 g/300 ml As a result of the above, as shown in Table 4, the tungsten removal effect was observed in the case where the roasting treatment was carried out after the acid treatment and before the alkali treatment. As shown in Table 5, the higher the roasting temperature was, the higher tungsten removal effect was observed.

Third Embodiment

In the present embodiment, the alkali treatment conditions were studied. Wastes having been subjected to the pre-treatment, the acid treatment and the roasting treatment according to the recovery method made as the basis in the above were subjected to an alkali treatment under respective treatment conditions. After the alkali treatment, water-washed residues were roasted at 900° C. for 4 hours under the air atmosphere, and samples after the roasting were subjected to a fluorescent X-ray analysis for the $Ta_2O_5$ concentration. The tungsten concentration was measured by an ICP emission spectroscopic analysis. The criterion was such that the case where a tungsten removal effect was observed was defined as ○, and particularly the case where the tungsten removal effect was high was defined as ◎.

TABLE 6

| No | Chemical Liquid | Concentration wt % | Temperature ° C. | Time hr | Concentration (wt %) $Ta_2O_5$ | W | Evaluation |
|---|---|---|---|---|---|---|---|
| Raw Material C | | | | | 70.7 | 12.0 | |
| 22 | NaOH | 20 | 80 | 5 | 86.3 | 1.8 | ◎ |
| 23 | | 10 | | | 87.0 | 2.0 | ◎ |
| 24 | | 5 | | | 83.1 | 5.7 | ◎ |
| 25 | | 1 | | | 78.9 | 7.2 | ○ |
| 26 | | 10 | 60 | | 78.6 | 5.7 | ◎ |
| 27 | | | 30 | | 76.1 | 7.7 | ○ |
| 28 | | | 80 | 0.5 | 82.4 | 5.7 | ◎ |
| Raw Material D | | | | | 88.1 | 4.7 | |
| 29 | NaOH | 10 | 80 | 5 | 93.6 | 1.3 | ◎ |
| 30 | | 20 | 80 | 5 | 93.9 | 1.3 | ◎ |
| 31 | KOH | 10 | 80 | 2 | | 1.8 | ◎ |
| 32 | | 10 | 80 | 5 | | 1.8 | ◎ |

Raw material: (Nos. 22 to 28) raw material C, (Nos. 29 to 32) raw material D
Weight/liquid volume ratio: (Nos. 22 to 28) 10 g/300 ml, (Nos. 29 to 32) 15 g/300 ml From Table 6, the higher the chemical liquid concentration and the treatment temperature were, and the longer the treatment time was, the higher tungsten removal effect was observed. From the above, the alkali treatment conditions are: preferably a chemical liquid concentration of 5 wt % or higher; and preferably a treatment temperature of 40° C. or higher. Also, in the case where either of sodium hydroxide and potassium hydroxide was used as the chemical liquid, tungsten could be removed.

Fourth Embodiment

Figure 2:
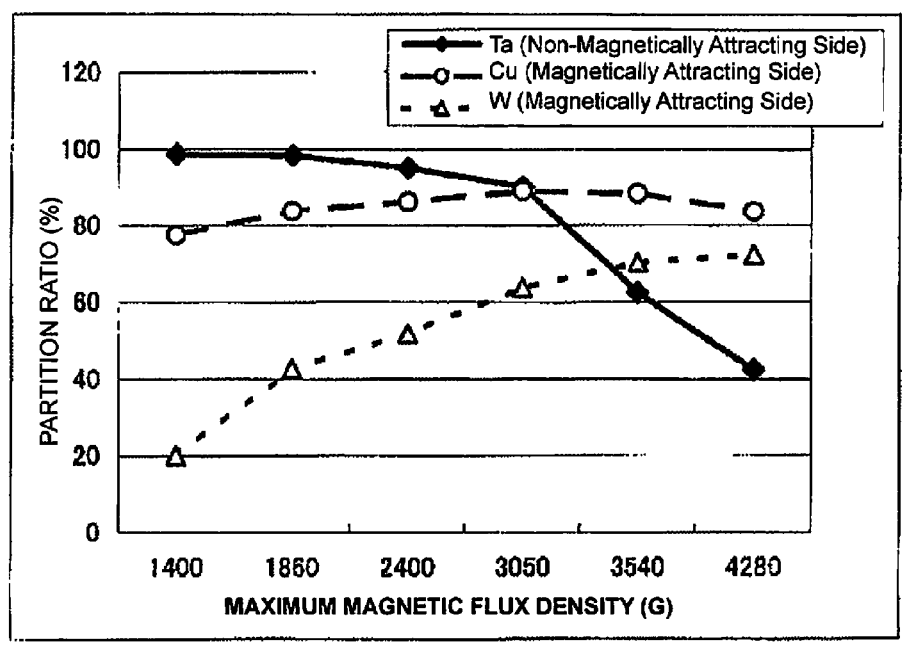
FIG. 2 is maximum magnetic flux densities vs. partition ratios in a magnetic separation treatment according to a fourth embodiment.

For a magnetic separation treatment (second-time) being a pre-treatment, a suitable range of the maximum magnetic flux density in the case where wastes in the present embodiment were used as a recovery object was determined. A separation treatment was carried out by using a magnet of 1,400 to 4,280 G in maximum magnetic flux density, and respective weight partition ratios of tantalum, copper and tungsten on a magnetically attracting side and a non-magnetically attracting side were analyzed. The higher the tantalum partition ratio on the non-magnetically attracting side and the higher the copper and tungsten partition ratios on the magnetically attracting side, the more suitable for the tantalum recovery method according to the present invention. The results are shown in Table 7 and FIG. 2.

TABLE 7

| | | Ta Partition Ratio (%) | Cu Partition Ratio (%) | W Partition Ratio (%) |
|---|---|---|---|---|
| 1400G | Magnetically attracted | 1.3 | 77.5 | 19.9 |
| | Non-magnetically attracted | 98.7 | 22.5 | 80.1 |
| 1860G | Magnetically attracted | 1.7 | 83.8 | 42.8 |
| | Non-magnetically attracted | 98.3 | 16.2 | 57.2 |
| 2400G | Magnetically attracted | 4.9 | 86.2 | 51.9 |
| | Non-magnetically attracted | 95.1 | 13.8 | 48.1 |
| 3050G | Magnetically attracted | 9.8 | 89.1 | 63.6 |
| | Non-magnetically attracted | 90.2 | 10.9 | 36.4 |
| 3540G | Magnetically attracted | 37.7 | 88.4 | 70.2 |
| | Non-magnetically attracted | 62.3 | 11.6 | 29.8 |
| 4280G | Magnetically attracted | 57.5 | 83.7 | 72.2 |
| | Non-magnetically attracted | 42.5 | 16.3 | 27.8 |

As a result of the above, in the present embodiment having carried out the magnetic separation, it was found that the maximum magnetic flux density was suitably in the range of 1,000 to 3,200 G, and especially suitably about 1,400 to 3,050 G. It is conceivable that many of wastes of the present embodiment have tantalum sintered compacts of tantalum capacitors containing manganese dioxide ($MnO_2$) being a weak magnetic material, and since the partition of tantalum on the magnetically attracting side increases when the maximum magnetic flux density is 3,540 G or higher, the tantalum recovery rate largely decreases.

Fifth Embodiment

In the present embodiment, according to the recovery method made as the basis in the above, tantalum capacitor condensates were subjected to pre-treatments of the crushing treatment, the sieving treatment, the magnetic separation treatment, the gravity separation treatment and the magnetic separation treatment in order, and thereafter analyzed for the tantalum concentration and the impurity concentrations in the series of recovery steps of the acid treatment, the roasting treatment and the alkali treatment.

The present embodiment carried out tests for two levels of crushing sizes of 1.5 mm or larger (Table 8) and 1.0 mm or larger (Table 9) in the crushing step. For the crushing size of 1.0 mm or larger, also a sample was tested which had been subjected to the alkali treatment after bulky materials of 0.75 mm or larger were removed by a sieving treatment after the roasting treatment, in addition to the above-mentioned series of recovery steps (Table 10). For component analyses in respective steps, samples roasted (at 900° C. for 4 hours) in the air after the respective treatments were used. After the sieving treatment, for samples after the magnetic separation treatment (first-time), component analyses were carried out by a fluorescent X-ray analysis; and for samples after the gravity separation treatment, component analyses were carried out by an ICP emission spectroscopic analysis or an atomic absorption analysis. The $Ta_2O_5$ concentration was calculated by subtracting the total value of concentrations of elements or oxides other than tantalum from 100 wt %. A tantalum recovery rate (%) was calculated by measuring a tantalum weight of a recovered material after each treatment and a tantalum weight of the sample before the each treatment, and using the expression of the tantalum weight after the each treatment/the tantalum weight before the each treatment×100.

TABLE 8

| No | Weight Ratio % | Concentration (wt %) | | | | | | | | | | | | | | | | Ta Recovery Rate (%) |
|---|---|---|---|---|---|---|---|---|---|---|---|---|---|---|---|---|---|---|
| | | $Ta_2O_5$ | Cu | W | Mn | Fe | Sb | Sn | Pb | Ni | Ti | Zn | Al | Si | P | Na | Cr | |
| Raw Material | 100 | 18.6 | 6.9 | 0.38 | 2.7 | 2.08 | 0.51 | 0.76 | 0.67 | 0.49 | 0.21 | 4.1 | 1.5 | 24.7 | 0.02 | ND | 0.06 | 100 |
| After Sieving Treatment | 88.5 | 17.0 | 6.4 | 1.6 | 2.2 | 2.04 | 0.62 | 0.95 | 0.82 | 0.33 | 0.20 | 1.2 | 0.58 | 28.0 | 0.02 | ND | 0.07 | 97.8 |
| After Magnetic Separation (1) | 81.4 | 19.2 | 9.2 | 1.7 | 2.2 | 0.19 | 0.60 | 1.1 | 1.01 | 0.18 | 0.13 | 0.95 | 0.59 | 26.6 | 0.03 | ND | 0.04 | 97.3 |
| After Gravity Separation | 43.7 | 41.9 | 31.0 | 3.3 | 3.7 | 0.77 | 0.009 | 0.31 | 0.19 | 1.1 | 0.11 | 4.2 | 0.31 | 0.10 | 0.03 | 0.005 | 0.14 | 96.7 |
| After Magnetic Separation (2) | 31.9 | 57.1 | 17.0 | 6.0 | 5.5 | 0.057 | 0.009 | 0.61 | 0.22 | 0.47 | 0.16 | 2.8 | 0.23 | 0.07 | 0.03 | 0.004 | 0.017 | 94.8 |
| After Acid Treatment | 20.3 | 92.6 | 0.63 | 3.8 | 0.38 | 0.004 | 0.002 | 0.033 | 0.004 | 0.012 | 0.16 | 0.004 | 0.21 | 0.05 | 0.03 | 0.002 | 0.003 | 94.8 |
| After Alkali Treatment | 18.4 | 95.9 | 0.62 | 0.91 | 0.45 | 0.005 | 0.002 | 0.039 | 0.003 | 0.014 | 0.18 | 0.004 | 0.22 | 0.03 | 0.03 | 0.041 | 0.003 | 81.7 |

(ND: below detection limit)
Crushing size: 1.5 mm or smaller
Weight/liquid volume ratio: (acid treatment) 80 g/300 ml, (alkali treatment) 20 g/80 ml
Acid treatment: 6 mol/L HCl, 80° C., 5 h, Air supply 1 L/min
Alkali treatment: 10 wt % NaOH, 80° C., 2 h

TABLE 9

| No | Weight Ratio % | Concentration (wt %) | | | | | | | | | | | | | | | | Ta Recovery Rate (%) |
|---|---|---|---|---|---|---|---|---|---|---|---|---|---|---|---|---|---|---|
| | | $Ta_2O_5$ | Cu | W | Mn | Fe | Sb | Sn | Pb | Ni | Ti | Zn | Al | Si | P | Na | Cr | |
| Raw Material | 100 | 18.6 | 6.9 | 0.38 | 2.7 | 2.1 | 0.51 | 0.76 | 0.67 | 0.49 | 0.21 | 4.1 | 1.5 | 24.7 | 0.02 | ND | 0.06 | 100 |
| After Sieving Treatment | 71.3 | 11.2 | 8.1 | 0.41 | 1.4 | 1.6 | 0.65 | 0.84 | 0.75 | 0.43 | 0.18 | 0.57 | 0.63 | 31.6 | 0.02 | ND | 0.04 | 95.4 |
| After Magnetic Separation (1) | 66.2 | 14.0 | 6.3 | 0.79 | 1.8 | 0.23 | 0.77 | 0.81 | 0.78 | 0.17 | 0.15 | 0.89 | 0.55 | 31.7 | 0.03 | ND | 0.03 | 94.8 |
| After Gravity Separation | 28.8 | 41.1 | 29.0 | 3.5 | 4.3 | 0.29 | 0.010 | 0.43 | 0.23 | 0.73 | 0.08 | 2.5 | 0.33 | 0.09 | 0.03 | 0.003 | 0.036 | 93.3 |
| After Magnetic Separation (2) | 20.0 | 59.4 | 17.0 | 3.3 | 6.5 | 0.053 | 0.008 | 0.62 | 0.21 | 0.45 | 0.13 | 1.7 | 0.27 | 0.05 | 0.03 | 0.003 | 0.016 | 92.0 |

TABLE 9-continued

| No | Weight Ratio % | Concentration (wt %) | | | | | | | | | | | | | | | Ta Recovery Rate (%) |
|---|---|---|---|---|---|---|---|---|---|---|---|---|---|---|---|---|---|
| | | Ta$_2$O$_5$ | Cu | W | Mn | Fe | Sb | Sn | Pb | Ni | Ti | Zn | Al | Si | P | Na | Cr | |
| After Acid Treatment | 12.3 | 93.8 | 0.32 | 1.5 | 0.37 | 0.004 | 0.003 | 0.029 | 0.004 | 0.007 | 0.12 | 0.002 | 0.57 | 0.02 | 0.04 | 0.002 | 0.003 | 89.9 |
| After Alkali Treatment | 11.1 | 96.8 | 0.25 | 0.58 | 0.40 | 0.005 | 0.003 | 0.030 | 0.003 | 0.006 | 0.19 | 0.001 | 0.21 | 0.04 | 0.03 | 0.045 | 0.003 | 76.7 |

(ND: below detection limit)
Crushing size: 1.0 mm or smaller
Weight/liquid volume ratio: (acid treatment) 80 g/300 ml, (alkali treatment) 20 g/80 ml
Acid treatment: 6 mol/L HCl, 80° C., 5 h, Air supply 1 L/min
Alkali treatment: 10 wt % NaOH, 80° C., 2 h

TABLE 10

| No | Concentration (wt %) | | | | | | | | | | | | | | | |
|---|---|---|---|---|---|---|---|---|---|---|---|---|---|---|---|---|
| | Ta$_2$O$_5$ | Cu | W | Mn | Fe | Sb | Sn | Pb | Ni | Ti | Zn | Al | Si | P | Na | Cr |
| Raw Material | 93.8 | 0.32 | 1.5 | 0.37 | 0.004 | 0.003 | 0.029 | 0.004 | 0.007 | 0.12 | 0.002 | 0.57 | 0.02 | 0.04 | 0.002 | 0.003 |
| Roasting Treatment → Alkali Treatment | 96.8 | 0.25 | 0.58 | 0.40 | 0.005 | 0.003 | 0.030 | 0.003 | 0.006 | 0.19 | 0.001 | 0.21 | 0.04 | 0.03 | 0.045 | 0.003 |
| Roasting Treatment → Sieving Treatment → Alkali Treatment | 98.3 | 0.047 | 0.48 | 0.44 | 0.004 | 0.002 | 0.006 | 0.002 | 0.004 | 0.008 | <0.001 | 0.01 | <0.01 | 0.03 | 0.025 | 0.001 |

Crushing size: 1.0 mm or smaller
Weight/liquid volume ratio: (acid treatment) 80 g/300 ml, (alkali treatment) 20 g/80 ml
Alkali treatment: 10 wt % NaOH, 80° C., 2 h For the crushing size of 1.5 mm, as shown in Table 8, the copper concentration decreased from 31.0 wt % to 17.0 wt % by the second-time magnetic separation treatment, and decreased further to 0.63 wt % by the hydrochloric acid treatment. The W concentration decreased from 3.8 wt % to 0.91 wt % by the alkali treatment. The Ta$_2$O$_5$ concentration was 41.9 wt % after the gravity separation treatment, and rose to 95.9 wt % by the subsequent magnetic separation treatment, acid treatment and alkali treatment. The tantalum recovery rate after the alkali treatment was 81.7%.

For the crushing size of 1.0 mm, as shown in Table 9, the copper concentration decreased from 29.0 wt % to 17.0 wt % by the second-time magnetic separation treatment, and decreased further to 0.32 wt % by the hydrochloric acid treatment. The tungsten concentration decreased from 1.5 wt % to 0.58 wt % by the alkali treatment. The Ta$_2$O$_5$ concentration was 41.1 wt % after the gravity separation treatment, and rose to 96.8 wt % by the subsequent magnetic separation treatment, acid treatment and alkali treatment. The tantalum recovery rate after the alkali treatment was 76.7%. As shown in Table 10, the case where the alkali treatment was carried out after the sieving treatment was carried out after the roasting treatment had a larger effect of decreasing each impurity than the case where no sieving treatment was carried out after the roasting.

Sixth Embodiment

In the present embodiment, a result of studies on more practical conditions of the magnetic separation treatment will be described. In the sixth embodiment, the magnetic separation treatment 1 in the flow shown in FIG. 1 was not carried out, and the removal of magnetically attracted materials was carried out only by the magnetic separation treatment 2. Therefore, the flow of the sixth embodiment involved subjecting tantalum capacitor concentrates to the crushing treatment, the sieving treatment and the magnetic separation treatment 2, and studying the magnetic separation treatment condition. The magnetic separation treatment 2 in the sixth embodiment carried out the magnetic separation treatment by using a drum magnetic separator (maximum magnetic flux density: 8,000 G) utilizing a drum-type ferrite magnet.

The condition of the magnetic separation treatment 2 was such that the maximum magnetic flux density (drum surface) of the magnetic separator was set at 1,500 G, 3,300 G, 4,400 G, 5,900 G and 8,000 G, respectively. The setting of the maximum magnetic flux density was adjusted by winding a rubber on the drum surface of the drum magnetic separator used. For the magnetic separation treatment carried out at the each maximum magnetic flux density, as in the fourth embodiment, respective weight partition ratios of tantalum, copper and tungsten on a magnetically attracting side and a non-magnetically attracting side were analyzed. The results in the sixth embodiment are shown in Table 11.

TABLE 11

| Magnetic Flux Density (G) | | Ta Partition Ratio (%) | Cu Partition Ratio (%) | W Partition Ratio (%) |
|---|---|---|---|---|
| 1500 | Magnetically attracted | 0.9 | 8.4 | 2.1 |
| | Non-magnetically attracted | 99.1 | 91.6 | 97.9 |
| 3300 | Magnetically attracted | 0.9 | 34.0 | 2.2 |
| | Non-magnetically attracted | 99.1 | 66.0 | 97.8 |
| 4400 | Magnetically attracted | 0.5 | 37.3 | 3.2 |
| | Non-magnetically attracted | 99.5 | 62.7 | 96.8 |
| 5900 | Magnetically attracted | 0.3 | 37.1 | 3.3 |
| | Non-magnetically attracted | 99.7 | 62.9 | 96.7 |
| 8000 | Magnetically attracted | 6.0 | 52.5 | 11.3 |
| | Non-magnetically attracted | 94.0 | 47.5 | 88.7 |

As shown in Table 11, it was found that although the tantalum recovery rate was high at a maximum magnetic flux density on the drum surface of 1,500 G, the removal rate of copper becoming an impurity remained low. When the maximum magnetic flux density was as high as 8,000 G, although the removal rates of copper and tungsten became high, the magnetic attraction of tantalum was caused and the recovery rate of tantalum decreased. From the results of the sixth embodiment, it was conceivable that the maximum magnetic flux density on the drum surface was practically about 2,000 G to 7,000 G, and more preferably 2,500 G to 6,500 G.

INDUSTRIAL APPLICABILITY

The present invention can remove copper and tungsten as well much contained in discarded substrates such as printed wiring boards, and enables recovering a high-purity tantalum at a high recovery rate from tantalum-containing wastes.

What is claimed is:

1. A tantalum recovery method for recovering tantalum from a tantalum-containing waste, the method comprising: subjecting a tantalum-containing waste, wherein the tantalum-containing waste is a tantalum sintered compact extracted from a tantalum capacitor, to a magnetic separation treatment which is carried out with a magnetic flux density of 2,000 G to 7,000 G, to thereby separate a non-magnetically attracted tantalum-containing material from a magnetically attracted portion of the tantalum-containing waste, and then subjecting the non-magnetically attracted tantalum-containing material to an acid treatment in an oxidizing atmosphere to thereby remove some impurities therefrom, and thereafter subjecting the tantalum-containing material from which some impurities have been removed to a roasting treatment and then an alkali treatment to thereby remove additional impurities therefrom and produce a recovered tantalum-containing material.

2. The tantalum recovery method according to claim 1, wherein the tantalum-containing waste contains at least one of copper and tungsten.

3. The tantalum recovery method according to claim 1, wherein the acid treatment is carried out with use of an acid containing hydrochloric acid, nitric acid or sulfuric acid.

4. The tantalum recovery method according to claim 1, wherein the alkali treatment is carried out with use of sodium hydroxide or potassium hydroxide.

5. The tantalum recovery method according to claim 1, wherein the tantalum-containing waste contains tungsten.

6. The tantalum recovery method according to claim 2, wherein the acid treatment is carried out with use of an acid containing hydrochloric acid, nitric acid or sulfuric acid.

7. The tantalum recovery method according to claim 5, wherein the acid treatment is carried out with use of an acid containing hydrochloric acid, nitric acid or sulfuric acid.

8. The tantalum recovery method according to claim 2, wherein the alkali treatment is carried out with use of sodium hydroxide or potassium hydroxide.

9. The tantalum recovery method according to claim 3, wherein the alkali treatment is carried out with use of sodium hydroxide or potassium hydroxide.

10. The tantalum recovery method according to claim 5, wherein the alkali treatment is carried out with use of sodium hydroxide or potassium hydroxide.

11. The tantalum recovery method according to claim 6, wherein the alkali treatment is carried out with use of sodium hydroxide or potassium hydroxide.

12. The tantalum recovery method according to claim 7, wherein the alkali treatment is carried out with use of sodium hydroxide or potassium hydroxide.

13. The tantalum recovery method according to claim 1, wherein the tantalum-containing waste contains copper.

* * * * *